(12) United States Patent
Sandru

(10) Patent No.: US 6,792,110 B2
(45) Date of Patent: Sep. 14, 2004

(54) APPARATUS AND METHOD FOR ENHANCING THE SECURITY OF NEGOTIABLE INSTRUMENTS

(76) Inventor: Calin A. Sandru, 26 Mistysugar Trail, Thornhill, Ontario (CA), L4J 8R5

( * ) Notice: Subject to any disclaimer, the term of this patent is extended or adjusted under 35 U.S.C. 154(b) by 112 days.

(21) Appl. No.: 10/184,998

(22) Filed: Jul. 1, 2002

(65) Prior Publication Data

US 2002/0164021 A1 Nov. 7, 2002

Related U.S. Application Data

(63) Continuation of application No. 09/564,955, filed on May 4, 2000, now Pat. No. 6,549,624, which is a continuation of application No. 08/808,266, filed on Feb. 28, 1997, now Pat. No. 6,233,340.

(30) Foreign Application Priority Data

Mar. 1, 1996 (CA) .............................................. 2170834

(51) Int. Cl.$^7$ ................................................. H01L 9/00
(52) U.S. Cl. .......................... 380/51; 380/287; 705/408; 705/62; 283/73; 283/74; 283/17; 283/58; 283/59; 283/72
(58) Field of Search ..................... 380/51, 287; 705/62, 705/408; 283/73, 74, 17, 58, 59, 72

(56) References Cited

U.S. PATENT DOCUMENTS

| | | |
|---|---|---|
| 3,829,133 A | 8/1974 | Smagala-Romanoff |
| 4,588,211 A | 5/1986 | Greene |

(List continued on next page.)

OTHER PUBLICATIONS

Schneier, Applied Cryptography, pp. 5–6, 30, 31, 216–217, 351–354, 461, 446–475, and 483–495.

Primary Examiner—Gregory Morse
Assistant Examiner—Paul Callahan
(74) Attorney, Agent, or Firm—Torys, LLP

(57) ABSTRACT

The invention relates to an apparatus and method for enhancing the security of selected information associated with a negotiable document, such as the monetary value of a cheque. In the invention, one or more security features are printed or applied onto the cheque. One such security feature is an encrypted control code. The preferred embodiment employs a secret key cryptographic scheme to encrypt the monetary value and thereby generate a first control code which is printed on the check. When the check is presented for payment, a validator, such as bank or cheque clearing house, employs a verification system having a copy of the encryption key to read the monetary value from the cheque and re-encrypt it according to said scheme to generate a second control code. The cheque is not honored if the first and second control codes are not identical.

Another security feature is a security image, composed, for instance, from a foreground image of the monetary value superimposed over a background motif image. The security image has a number of hidden attributes, such as the relative aspect ratios, absolute and relative dimensions of the underlying foreground and background images, that are preselected and used when printing the security image. When the cheque is presented for payment a teller can visually inspect the security image for compliance with certain of the preselected attributes. The preferred validation system can also electronically scan the security image for the hidden attributes. This comparison makes it difficult for a forger to copy, for instance, the monetary value of the cheque and add a significant digit to it because some of the foregoing preselected image attributes are liable to change and be detected. The composite image serves as a back-up security when verification of the encrypted control code is not possible.

17 Claims, 9 Drawing Sheets

U.S. PATENT DOCUMENTS

| | | |
|---|---|---|
| 4,614,362 A | 9/1986 | Breen et al. |
| 4,637,634 A | 1/1987 | Troy et al. |
| 4,948,094 A | 8/1990 | Fahl |
| 4,948,174 A | 8/1990 | Thomson et al. |
| 5,044,668 A | 9/1991 | Wright |
| 5,321,765 A | 6/1994 | Costello |
| 5,341,428 A | 8/1994 | Schatz |
| 5,383,685 A | 1/1995 | Lee |
| 5,384,846 A | 1/1995 | Berson et al. |
| 5,432,506 A | 7/1995 | Chapman |
| 5,509,692 A | 4/1996 | Oz |
| 5,524,073 A | 6/1996 | Stambler |
| 5,673,320 A | 9/1997 | Ray et al. |
| 5,754,653 A | 5/1998 | Canfield |
| 5,799,092 A | 8/1998 | Kristol et al. |
| 6,233,340 B1 * | 5/2001 | Sandru .................. 380/51 |
| 6,549,624 B1 * | 4/2003 | Sandru .................. 380/51 |

* cited by examiner

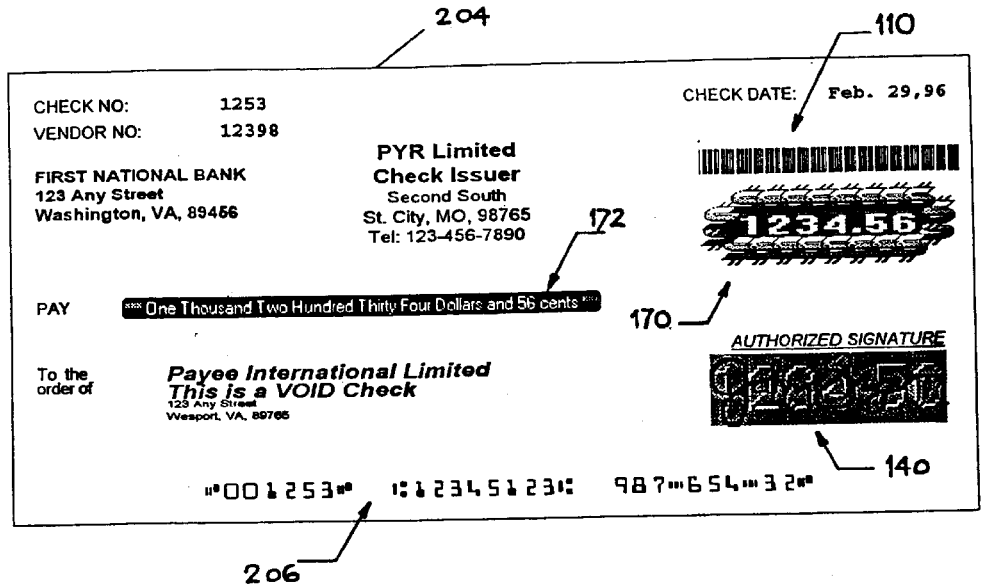
Figure 5
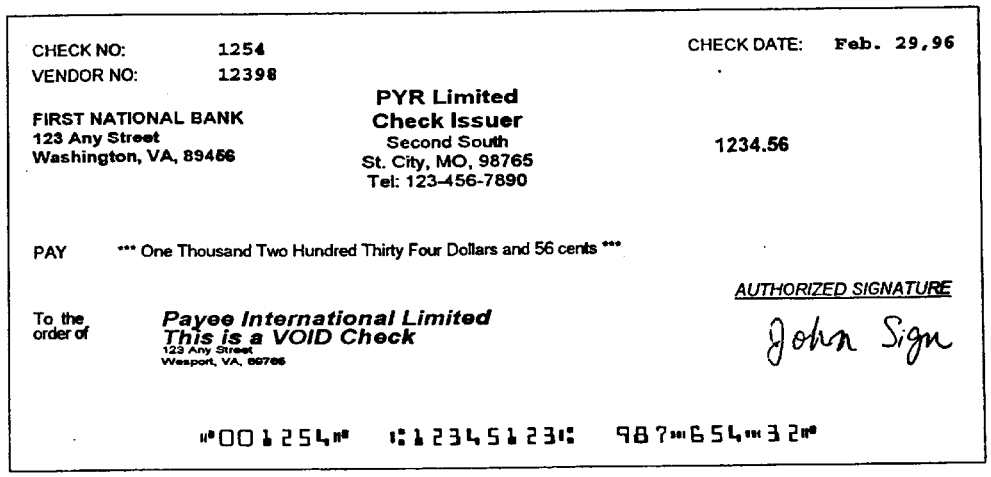
Figure 6 - Prior Art

APPARATUS AND METHOD FOR ENHANCING THE SECURITY OF NEGOTIABLE INSTRUMENTS

CROSS-SECTION TO RELATED APPLICATIONS

This is a continuation of application Ser. No. 09/564,955 filed May 4, 2000 U.S. Pat. No. 6,549,624, which in turn is a continuation of application Ser. No. 08/808,266 filed Feb. 28, 1997, which issued as U.S. Pat. No. 6,233,340 on May 15, 2001. The contents of these applications are hereby incorporated by reference.

FIELD OF INVENTION

The invention relates to the field of cheque protection, and more particularly to an apparatus and method for protecting negotiable documents from being fraudulently tampered with.

BACKGROUND OF THE INVENTION

Negotiable transactions typically involve the following parties: a payor, a payee, and a corresponding financial institution such as a bank or other type of intermediary such as a clearing-house. A negotiable document or instrument issued as a form of payment, for instance a cheque, is used by the financial institution to transfer funds between accounts, typically to credit the payee's account and debit the payor's account. Information about all parties involved in the transaction is contained in the negotiable document.

Traditionally, the payor's handwritten signature has been used as an indicia of the authenticity of the document and the information contained therein. The underlying reasons for this include:

(1) a signature is assumed to be difficult to forge, thereby serving as proof that the signor is cognizant of and in agreement with the contents of the document, particularly the amount and identity of the payee;

(2) a signature is assumed to be non-reusable — it is thought of as being an integral or inseparable part of the document and cannot easily be transferred to, or reproduced onto, another document;

(3) once signed, it is assumed that the document cannot be modified or altered; and (4) it is generally assumed that the signature cannot be repudiated.

In reality, these assumptions are generally false. Unless an expert in fraud detection is consulted, the typical financial clerk cannot detect a forged signature. Nor have electronic systems progressed to the point where they can accurately or consistently identify forged signatures. Even if a signature is authentic, it is not very difficult to alter documents after being signed, particularly the monetary value of the document or the identity of the payee. Moreover, the entire cheque may be fraudulently produced such that no alterations or additions to the negotiable document may be readily discerned.

Cheque fraud has been considered to be the third largest type of banking fraud, estimated to be about fifty million dollars per year in Canada according to a 1993 KPMG Fraud Survey Report. In the United States, such fraud is estimated to cause financial loss of over ten billion dollars per year, according to Abagnale & Associates. Financial institutions and corporations spend a great deal of time, effort and money in preventing or recovering from fraudulent cheques. With the recent proliferation and affordability of computer hardware such as document scanners, magnetic-ink laser printers, etc., cheque fraud is expected to reach new limits.

To date, various attempts have been made to protect cheques from fraudulent interference of the type described above. One method is to use mechanical amount-encoding machines which create perforations in the document reflecting the monetary value thereof. The perforations in the document define the profile of an associated character or digit. However, a cheque forger can still scan the payor's signature and reprint the cheque with a new amount using the same type of readily available mechanical encoding machine to apply the perforations. This method also has a significant drawback due to the amount of time and human labour required to produce cheques, and thus may be considered expensive or impractical for certain organizations.

Indeed, even without the use of mechanical amount-encoding machines, a December 1992 study by the Hacket Group, cited in *Canadian Business*, Vol. 65, page 19, of 55 leading American Corporations found that the typical corporation spends over US$6 for preparing or processing every cheque. The breakdown of this expense includes:

a) costs to secure cheque storage;

b) costs to print variable data such as the amount of the cheque, the payee, etc., whether printed manually or electronically;

c) costs to decollate continuous cheque forms typically used in cheque printing; and d) costs to manually or mechanically apply the requisite signature, assuming such signature is not pre-reproduced on the cheque stock.

Another prior art cheque protection method uses electronic means to print the numerical amount of the cheque using special fonts, supposedly difficult to reproduce. A negotiable document is considered unforged if it contains the special font and if the characters representing the monetary value of the cheque are not tampered with. Due to the fact that these characters are difficult to produce without a machine or a computer, the cheque is assumed to be protected. Given the ready availability if high quality scanners and printers, it is, however, possible that the cheque forger will copy one of the characters printed on the cheque and paste it as the most significant digit of the amount thereby increasing the monetary amount of the transaction. As such, after the forger reprints the cheque with a new most significant digit, the cheque will meet the criteria of having the special fonts defining the numerical amount, whereby the forged document may be interpreted as a valid cheque.

Other types of cheque validation techniques are disclosed in U.S. Pat. No. 4,637,634 to Troy et al. This reference disclose a sales promotional cheque which consists of a top cheque half, distributed through direct mail, flyers, newspaper inserts, etc., and a bottom cheque half which may be obtained, for example, when a stipulated purchase of goods or services has been made by the intended payee. If information on the top and bottom halves match, the cheque becomes a negotiable instrument. For validation purposes, the bottom half is provided with at least one code number that is generated, using a complex mathematical formula, from the cheque number, the register number, and the script dollar amount, all of which are present on the face of the cheque in human-readable form. The validation code number appears as a bar code or other machine readable code on the face of the cheque. For verification purposes, the same code number appears underneath an opaque "rub-off" overlay which, if tampered with, renders the cheque void. To verify the cheque, the opaque overlay is removed to reveal the concealed code number which is then compared against the machine readable code number printed on the cheque. This system is still prone to tampering because one could alter the amount of the cheque without tampering with the code numbers. To avoid this situation, the cheque must be compared against a predefined list, i.e. an electronic file, listing all of the payor's cheques to verify the original amount. Thus, this system may therefore be impractical for most organizations and is incompatible with current cheque clearing procedures.

There remains a need for securing information associated with negotiable documents form being fraudulently tampered with. Moreover, there remains a need for such a security system which is compatible with current cheque printing systems and cheque clearing systems, and which generates cheques that are essentially non-repudiable.

SUMMARY OF THE INVENTION

The invention applies or prints certain security features onto a negotiable instrument, e.g. a cheque, at the time it is created. In one aspect of the invention, a data key associated with a cryptographic scheme is used to encrypt preselected information pertaining to the cheque, thereby "locking" such information on the cheque and preventing it from being altered or forged. The encrypted information can only be decoded or validated by a financial intermediary, such as a bank or cheque clearing house, because only they, apart from the payor, possess a corresponding data key necessary to decode or validate the encrypted information.

In the preferred embodiment of the invention, the cryptographic scheme is a secret key scheme embodied in a cheque printing system which the payor uses to encrypt the monetary value of the cheque using at least one secret alphanumeric key. The system prints the encrypted information on the cheque in a machine readable form, such as a bar code. The encrypted information acts as a control code for verification purposes. When the financial intermediary is presented with the cheque for payment, it has a validation system which uses the same cryptographic scheme as the payor to re-encrypt the same information the payor originally encrypted, i.e. the monetary value of the cheque. If the resulting re-encrypted information, which constitutes a second control code, is not identical to that originally printed on the cheque, the cheque is not honoured by the financial intermediary.

Hence, according to one aspect of the invention, there is provided a process for enhancing the protection of selected information associated with a negotiable instrument from forgery, comprising the steps of: a) selecting an encryption key; b) encrypting a combination of the selected information and the encryption key with a relatively secure cryptographic scheme to thereby generate a first control code; and c) printing the selected information and the first control code on the negotiable instrument. Thereafter, a validator, such as the financial intermediary, who possesses a copy of the encryption key, can read the un-encrypted selected information from the negotiable instrument, re-combine it with the encryption key and re-encrypt the combination according to said scheme to generate a second control code. The negotiable instrument is not honoured by the validator if the first and second control codes are not identical. It will be appreciated that in this manner, the financial intermediary charged with validating the cheque does not require advance information about the preselected information such as the monetary value of the cheque form the payor in order to adequately verify the cheques.

In order to ensure security, the secret key encryption algorithm is non-linear and essentially irreversible. The preferred encryption algorithm is modeled after a 32 bit Cycle Redundancy Check ("CRC") algorithm wherein the encryption key is concatenated with the data to be encrypted to form a source polynomial which then is divided by a 32 degree Tchebychev polynomial. The division produces a remainder which functions as the control code printed on the cheque.

Alternative embodiments of the invention can employ other types of cryptographic systems, including public key cryptosystems such as the known RSA scheme. According to this aspect of the invention a process is provided for enhancing the security of a cheque. The process includes selecting private and public encryption keys associated with a cheque payor or cheque validator; selecting information found on the cheque wherein the selected information varies for each instantiation of the cheque presented by the same payor; encrypting a combination of the selected information and one of the private and public keys with a practicably secure cryptographic scheme to thereby generate a control code; printing the selected information and the control code on the cheque; reading the selected information from the cheque; decrypting the control code using the other of the public and private encryption keys to thereby obtain decrypted information; and refusing to honour the cheque if the selected information found on the cheque does not match the decrypted information.

The preferred embodiment of the invention incorporates additional security measures to discourage forgery. In one of these, a security image is printed on the cheque, the image composed of a bit-map (or other form of digitized representation) of the payor's signature which is superimposed over a background motif bit-map, such as the monetary value of the cheque depicted in a "imprint" font, i.e. a simulated three dimensional, character font. A variety of characteristics of the image are used to verify the authenticity of the cheque, as described below.

The cheque is authenticable by virtue of the fact that each of the signature and monetary value bitmaps (or bitmaps of other foreground and background images) has certain attributes, such as aspect ratios, dimensions, etc., and the combination of the bitmaps has certain attributes, such as the relative sizes of the bitmaps, which attributes are preselected and used when the payor prints the bitmaps on the cheque. The security image is later scanned by the verification system located at the financial intermediary for comparison to the preselected attributes, as described in greater detail below. This comparison makes it difficult for a forger to copy the imprinted monetary value and, for example, add a significant digit to the monetary value of the cheque because the respective preselected bit-map attributes, such as aspect ratio, relative sizes of the bit-maps etc., are liable to change and be detected.

In addition to the foregoing attributes, the three dimensional font of the imprinted monetary value has a fading factor associated with it, as described in greater detail below, which is set to a pre-selected value. When the security image is scanned in by the financial intermediary, the fading factor associated with the font of the scanned image is compared to a preselected fading factor. This comparison makes it difficult for a forger to copy the imprinted face value, add a significant digit and scale the resultant image to its original size (in an attempt to avoid changing the bit-map attributes) without affecting the original fading factor.

In the preferred embodiment, an additional image is printed on the cheque to provide another security feature. This image comprises a bit-map of the monetary or face value of the cheque in "reverse print" (i.e. white characters for use over a dark background) superimposed on a background motif bit-map. Again, certain attributes of these bit-maps, such as aspect ratio, relative dimensions etc,. are preselected and analysed by the verification system located at the financial intermediary for any deviations from the pre-determined standards.

BRIEF DESCRIPTION OF THE DRAWINGS

The present invention will be understood and appreciated more fully from the following detailed description, taken in conjunction with the following drawings, in which:

FIG. 5 is an illustration of a cheque produced in accordance with the preferred embodiment; and FIG. 6 is an illustration of a typical prior art cheque.

DETAILED DESCRIPTION OF PREFERRED EMBODIMENTS

Figure 1A:
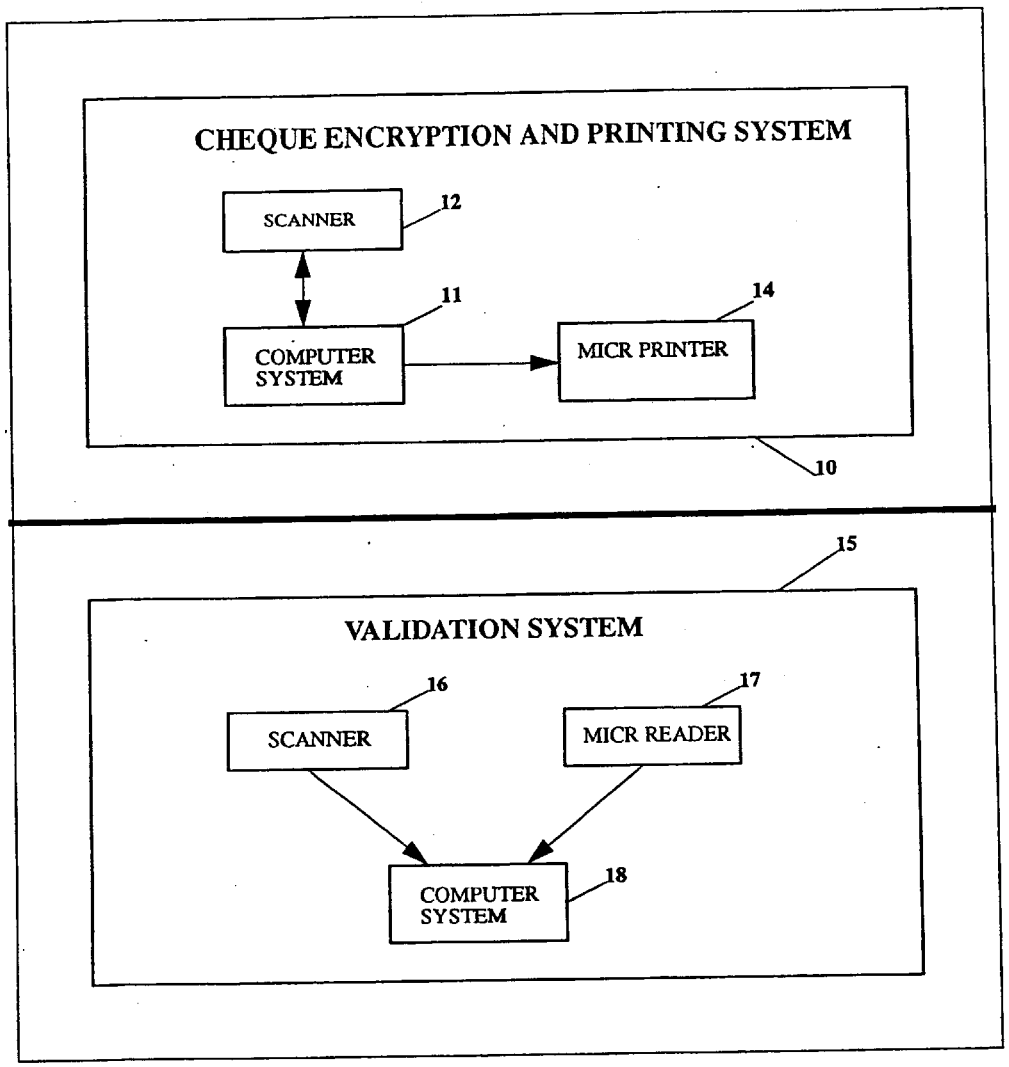
FIG. 1A is schematic diagram of hardware employed in a preferred embodiment of the invention.

FIG. 1A illustrates the hardware employed in the preferred embodiment of the invention. The payor organization uses a system 10 for encrypting and printing negotiable documents, for example, cheques, which are exemplified herein. System 10 comprises a conventional computer system 11, for instance a desktop personal computer, which is connected to an optical scanner 12 and a magnetic ink printer 14 or other type of character recognition output device. The computer 11 runs encryption and cheque printing software 100, 130 and 166 described below (see FIGS. 1B, 2C and 3C respectively), as well as any other software the payor may require to interface or integrate the invention with the payor's accounting or payment system. etc. Scanner 12, which is optional, is used to scan in or otherwise reproduce and digitize handwritten signatures that are to be applied to cheques. Printer 14 is used to print the cheques, including the security features described herein. For fully automated processing of the cheques, printer 14 must be compatible with known cheque reading or scanning devices located at the clearing house, which are typically magnetic ink character recognition ("MICR") devices.

Once the cheques are printed and distributed to the payees, the bank and/or clearing house uses a corresponding validation system 15 to validate the cheques. Validation system 15 includes an MICR reader 16 and optical scanner 17 which are connected to a computer system 18. System 18 includes application software 220 used to validate the security features described below. System 18, which identifies valid and invalid cheques, can also be used to run or interface with the clearing house's conventional cheque-clearing software systems.

In the invention, one or more security features are printed or applied on a cheque. These security features include an encrypted control code which is printed in machine readable form on the cheque as well as composite images which have certain pre-selected attributes detectable by electronic means that are difficult to alter without detection.

Encrypted Control Code

To produce the encrypted control code ("ECC"), an encryption algorithm mathematically combines pre-selected information about the cheque, such as the monetary value of the cheque, with one or more encryption keys. The result of the mathematical operation(s) is the ECC. The encryption algorithm can be based on "secret key" or "public key" cryptography, both of which employ private encryption keys whose circulation is restricted to one or at most only a few persons. In the former case, the ECC is sometimes referred to as a "validation check or code"; in the latter case, the ECC is sometimes referred to as a "digital signature". In either case, the clearing house verifies the authenticity of the ECC, as described in greater detail below. Provided a secure encryption process is employed, it becomes very difficult for a forger to alter the monetary value or other pre-selected information associated with the cheque because it is provided in an essentially non-alterable form. In addition, it is difficult for a forger to create a wholly fraudulent cheque because to do so would require knowledge of the payor's private encryption key.

The preferred embodiment of the invention employs a secret key encryption scheme modelled after the known Cycle Redundancy Check ("CRC") algorithm commonly used in communications protocols to verify the contents of a packet of information. The CRC scheme is based upon the mathematical operation of dividing a polynomial, referred to as the source polynomial, by a Tchebychev polynomial, i.e. a large prime polynomial.

Figure 1B:
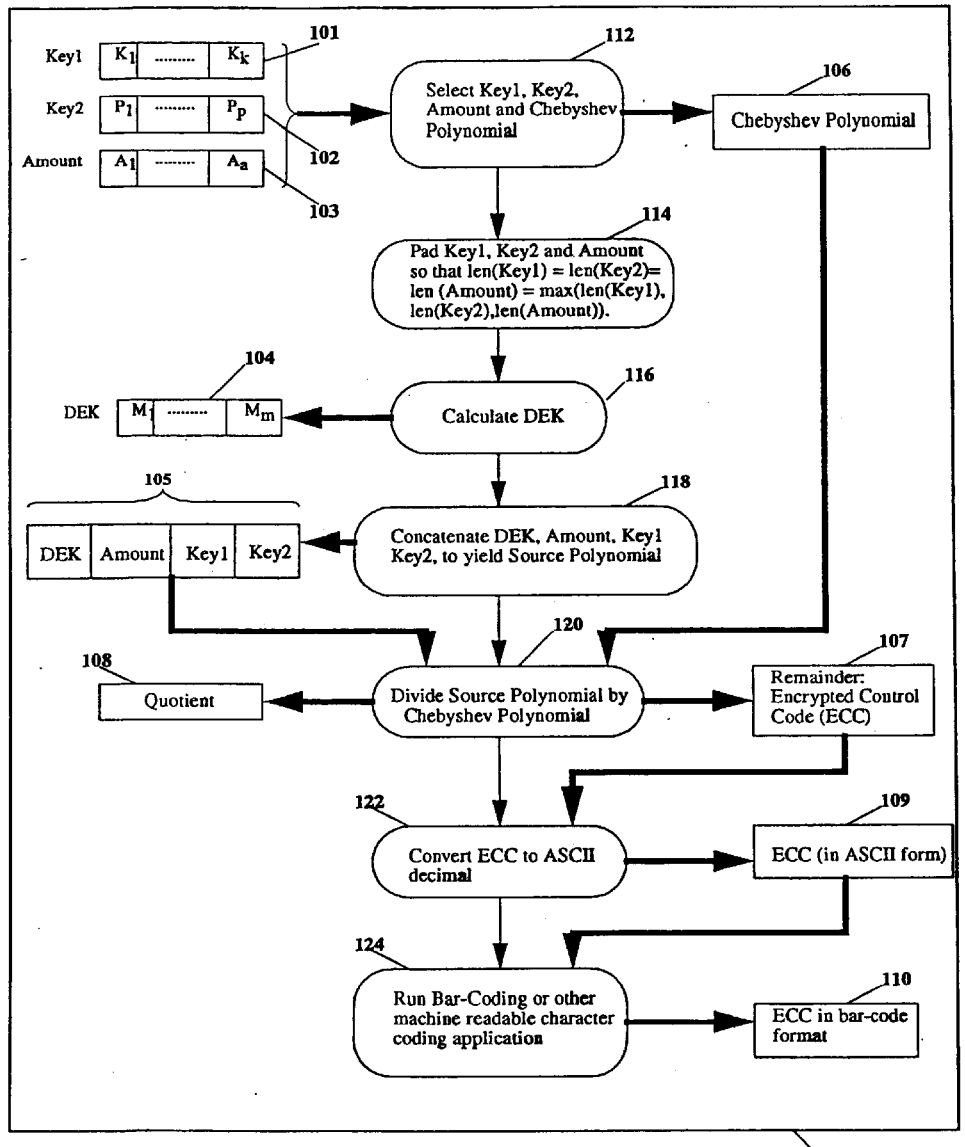
FIG. 1B is a data and procedural flowchart diagram of an encryption algorithm employed in the preferred embodiment which produces an encrypted control code for application onto a negotiable document.

FIG. 1B illustrates the procedural steps in the preferred encryption process of the invention, which is implemented by software 100 running on computer system 11. A first process step 112 selects, retrieves or otherwise identifies four preliminary data items or variables required by the preferred process:

a) a first encryption key 101, key_1, composed of the characters or digits $k_1 \ldots k_K$;

b) a second encryption key 102, key_2, composed of the characters or digits $p_1 \ldots p_P$;

c) some pre-selected information pertaining to and visible on the negotiable document, preferably the monetary value or Amount 103 of the cheque, composed of the characters or digits $A_1 \ldots A_a$; and d) the Tchebychev polynomial 106, composed of the digits or characters $C_1 \ldots C_c$, for use as the divisor in the CRC division operation.

The encryption keys 101 and 102 can be any alphanumeric character, and theoretically of any length, although practically limited to a length of from about six to twenty digits, twelve characters (or bytes) being the preferred length. One of the keys preferably identifies a particular bank, and the other key preferably identifies a particular payor organization. In this manner, the distribution of keys among banks and payor organizations can be efficiently managed. Of course, new keys are preferably distributed from time to time in case the secrecy surrounding the keys has been breached. In any event, because the preferred embodiment employs a secret key encryption scheme, it is necessary for the validation system 15 to also store or access both keys 101 and 102.

The Tchebychev polynomial 106 is predefined. Again, the polynomial 106 must be stored or accessible to the encryption system 10 and the validation system 15. The value of polynomial 106 is also preferably changed from time to time in case the secrecy surrounding it has been breached. The polynomial is represented in digital form by representing each bit in a digital word with a corresponding term of the polynomial, e.g. $x^{31}+x^{30}+x^{29}+x^{27}+x^{26}+x^{24}+x^{23}+x^{21}+x^{20}+x^{19}+x^{15}+x^9+x^8+x^5$ is represented by 1110 1101 1011 1000 1000 0011 0010 0000, or 0xEDB88320.

A second step 114 pads variables 101, 102, and 103 with zeros (i.e. 0x00) so that the character, or byte length of each variable 101, 102 and 103 is equal to the length of the longest variable, that is, a=k=p=max(a,k,p.). The padding can occur at the most significant or least significant end of the variables. In addition, this step strips the ASCII representation of the decimal placeholder (".") from Amount 103.

A third step 116 calculates a derived encryption key ("DEK") 104 from the other variables 101, 102 and 103. The formula used to derive DEK is as follows:

for (i mod 4)=0, $DEK_i=A_iK_i$ OR (NOT $A_i$)$P_i$;

for (i mod 4)=1, $DEK_i=A_i$ XOR $K_i$ XOR $P_i$;

for (i mod 4)=2, $DEK_i=A_iK_i$ OR $A_iP_i$ OR $K_iP_i$;

for (i mod 4)=3, $DEK_i=A_i$ XOR $K_i$ XOR $P_i$;

where A is Amount 103, K is key_1 (101), P is key_2 (102), and i is a counter into the characters or bytes of A, K, and P (which are now all the same length), the sense of the count being preferably from the most significant to the least significant digit, or alternatively from the least to most significant digit. Thus, for example, if A is equal to the string "12345600", K is equal to the string "69752459" and P is equal to the string "98369103", DEK calculates to 0x[38,33,37,37,38,30,0A] or ASCII "8377830◙". The above formula maps the characters of A, K and P into a linearly independent vector space and thus "scrambles" the information from the other keys for use in the encryption process, thereby making it more difficult to "reverse engineer" the source polynomial, as described in greater detail below. A variety of mathematical relationships known in the art can be used in the alternative.

A fourth step 118 concatenates DEK (104), Amount (103), key_1 (101) and key_2 (102) into a source polynomial 105, the representation being as described above with reference to the Tchebychev polynomial. The order of concatenation is not important, but preferably the amount 103 does not lead or trail the source polynomial 105. Source polynomial 105 represents a polynomial of degree N, where N is the bit length thereof.

A fifth step 120 divides the source polynomial 105 by the Tchebychev polynomial 106 using methods known in the art. The division yields a quotient 108, which is discarded, and a remainder 107, which functions as the encrypted control code. Carrying on with the above numerical example, dividing the source polynomial derived by the concatenation of "8377830◙", "12345600", "98369103" and "69752459" by the Tchebychev polynomial 0xEDB88320 yields 0x6FACAC7B or decimal 1873587323. The reader is referred to Schwaderer, D., "*C Programmer's Guide to NetBIOS, IPX and SPX*", Sams Publishing, Prentice Hall, Indiana, 1992, for further details concerning efficient algorithms for the division of polynomials and the computation of a CRC validation code.

A sixth step 122 converts the remainder 107 into an ASCII decimal representation 109. In the above example, then, the ECC becomes the string "1873587323".

Figure 1C:
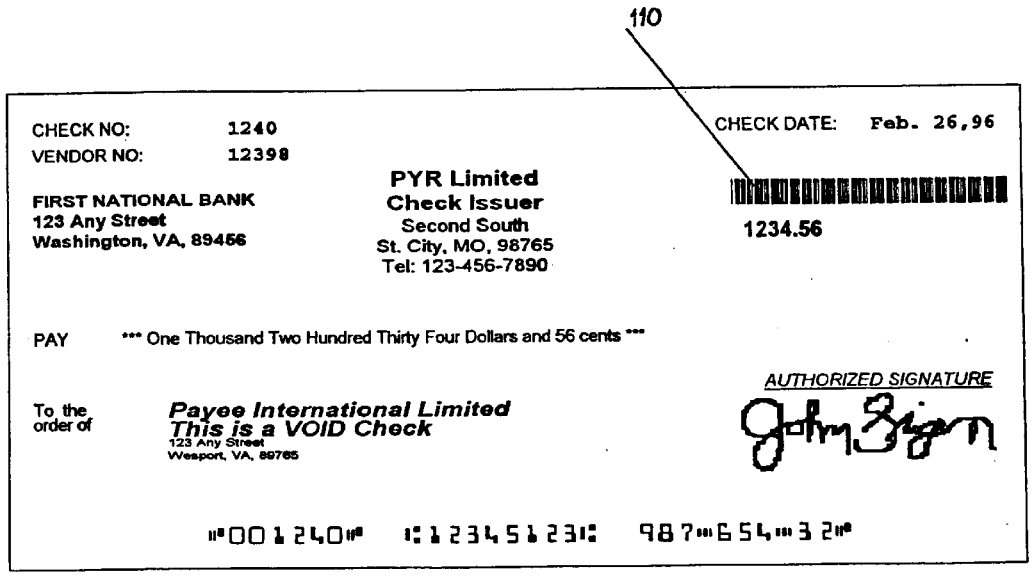
FIG. 1C is an illustration of a cheque having the control code printed thereon.

A seventh step 124 calls conventional bar coding software, as is well known in the art, to generate a bar code 110 from the ECC decimal represented in ASCII. The bar code 110 is printed on the cheque as shown in FIG. 1C. Alternatively, this step prints optically recognizable characters such as the known OCR A, OCR B, E13B standards, etc. or other types of machine readable characters instead of the preferred bar codes. In the further alternative, the ECC can be printed in MICR characters and positioned at the bottom of the cheque in the "MICR line" where accounting and transit routing information is typically printed in MICR characters.

When the verification system 15 reads the cheque, it will apply steps 112 through 122 of algorithm 100 using the monetary value shown on the face of the cheque to compute a second control code. If the computed control code differs from control code 110, then it is likely that the monetary value of the cheque has been fraudulently altered or otherwise tampered with, and the cheque is therefore rejected.

From the foregoing, it is apparent that a variety of modifications can be made to the preferred embodiment. First, any information on the face of the cheque can be encoded, either in combination with Amount 103 or in lieu thereof. In particular, the additional encryptable information can be any of: the date of the cheque, the payee, or a transit/routing account number associated with the payee or payor. Alternatively, the encryption algorithm 100 can be repeated or re-run to produce an additional control code based on the additional data. Second, it is only necessary to have one secret encryption key known to the payor and clearing house. Third, it is not absolutely necessary to incorporate a derived encryption key into the source polynomial.

The preferred embodiment provides an essentially irreversible encryption scheme. If the Tchebychev polynomial 106 is a 32 degree polynomial, the control code 110 will be a 31 degree polynomial. The probability of two randomly selected polynomials of the same degree to generate the same remainder by division with the same Tchebychev polynomial is believed to be less than $10^{-9}$, i.e. one in a billion. In order to obtain Amount 103 and the encryption keys 101 and 102, assuming that the encryption algorithm is known, a forger will be required to know the quotient 108 which is discarded during calculation. Alternatively, the forger will have to perform, on average, $2^{N-1}$ permutations of calculations to generate polynomials that, subjected to division with the same Tchebychev polynomial, will produce the same remainder. If the size of the keys are not known, then it is believed that, on average, $$\sum_{N=1}^{KeySize} 2^{N-1}$$

calculations are necessary to derive the encryption key. Depending on the size of the keys and the number of steps used in encryption, an extremely large computational effort is required to obtain the keys. This effectively renders the encryption scheme irreversible, due to the sheer number of calculations that would be required to discover the underlying polynomials. Thus, provided the secret keys are confidentially maintained, the preferred secret key cryptographic scheme is essentially a secure system.

While the preferred embodiment has described a particular secret key encryption scheme, it will be appreciated that practically any essentially non-reversible secret key encryption scheme can be used to produce the encrypted code 110 which is applied to the cheque. Moreover, a public key cryptographic system, such as the known RSA public key scheme, can be used to apply a digital signature, as is well known in the art. It will be appreciated, however, that with the digital signature of the RSA scheme, the original message is encrypted with one of a payor's (or validator's) private and public keys to produce the digital signature which is conveyed or transmitted to the recipient along with the un-encrypted message. Thereafter, the digital signature is decrypted using the other of the private and public keys to retrieve a copy of the original message. If the decrypted message matches the transmitted message, then it is considered to be authentic. In contrast, the authentication or validation phase of the preferred embodiment re-encrypts the message to ensure that the same encrypted message or control code is obtained.

Security Images

The preferred embodiment of the invention also incorporates additional security measures to discourage forgery. These measures include the printing of security images on the cheque, the images being composed of a foreground bitmap overlayed over a background bitmap (or other form of digitized representation). A variety of attributes or characteristics of the resultant image are used to verify the authenticity of the cheque, as described below.

Figure 2A:
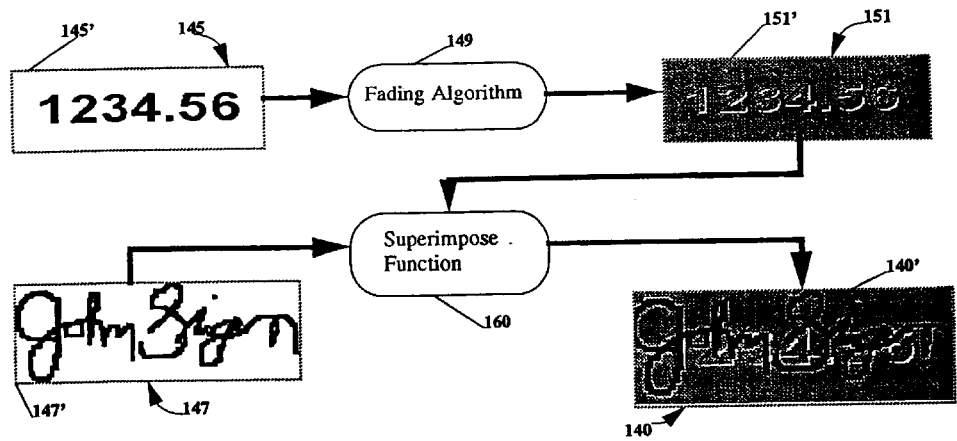
FIG. 2A is a data flow diagram illustrating the composition of a first security image according to the preferred embodiment, the image being composed of a signature stored in digital form superimposed over a background image of the numerical value of the cheque.
Figure 2B:
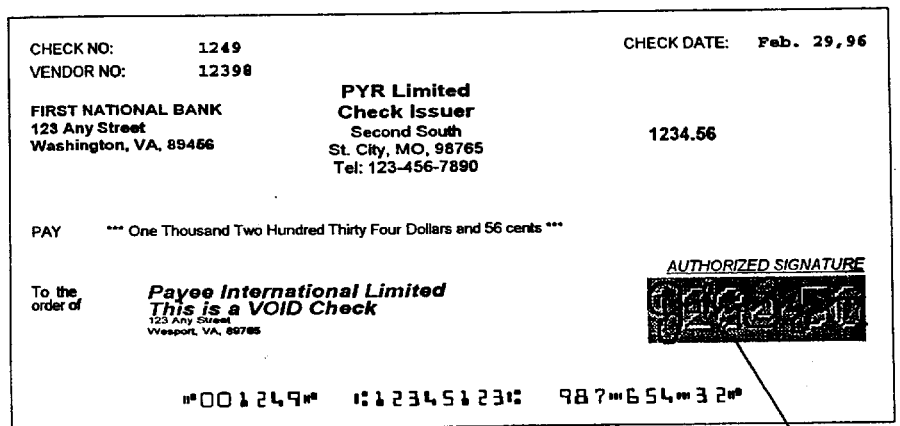
FIG. 2B is an illustration of a cheque having the security image shown in FIG. 2A printed thereon.

FIG. 2B shows a security image 140, referred to as a Signature Controlled Amount or "SCA" image, printed on a cheque. The data flow diagram of FIG. 2A illustrates how underlying foreground and background bitmaps are combined to compose the SCA image 140.

In a first stage, a bitmap 145 of the monetary or numerical value of the cheque is subjected to a fading algorithm 149, described in greater detail below, to create a background bitmap 151 which depicts the numerical value in a simulated three-dimensional or "imprint" font. The fading algorithm employs a fading factor as described below, to create this font. This factor, which is one of the attributes of the SCA image 145, is pre-selected by payor system 10 and is detectable by validation system 15.

In a second stage, a bitmap 147 of an authorizing signature is combined or superimposed over the background bit-map 151. Before doing so, however, each of bitmaps 147 and 151 are scaled to pre-determined aspect ratios (i.e. ratio of width to height). In addition, the background bitmap is scaled or sized to fit within a designated area on the cheque of pre-selected dimensions. The scaling and sizing of the foreground signature bitmap 147 is controlled so that there is a preset ratio or proportion between the size or area of a frame 147' thereof and the size or area of a frame 151' of the background bit-map 151. (The term "frame" is used in the sense of a physical border or boundary of a printed image.) In the illustrated embodiment of FIG. 2B, the frames 147' and 151' are of equal size and the aspect ratio of the frames is approximately 2.5:1. (The phantom rectangular borders shown in FIG. 2A surrounding the contents of bitmaps 145, 147 and 151 are only for illustration purposes, i.e., to show the frame encompassing the bit-mapped image. The actual bitmap itself will generally not have or show a visible distinct border.) Then, signature bitmap 147 is superpositioned over background bitmap 151 to form the SCA image 140 which is printed on the cheque. The SCA image 140 is later scanned by the verification system 15 for comparison to these preselected attributes. This analysis makes it difficult for a forger to copy the imprinted monetary value and, for example, add a significant digit thereto, because doing so will change one or more of the aspect ratio, relative sizes of the bit-maps, or the fading factor, and thus be detected.

Figure 2C:
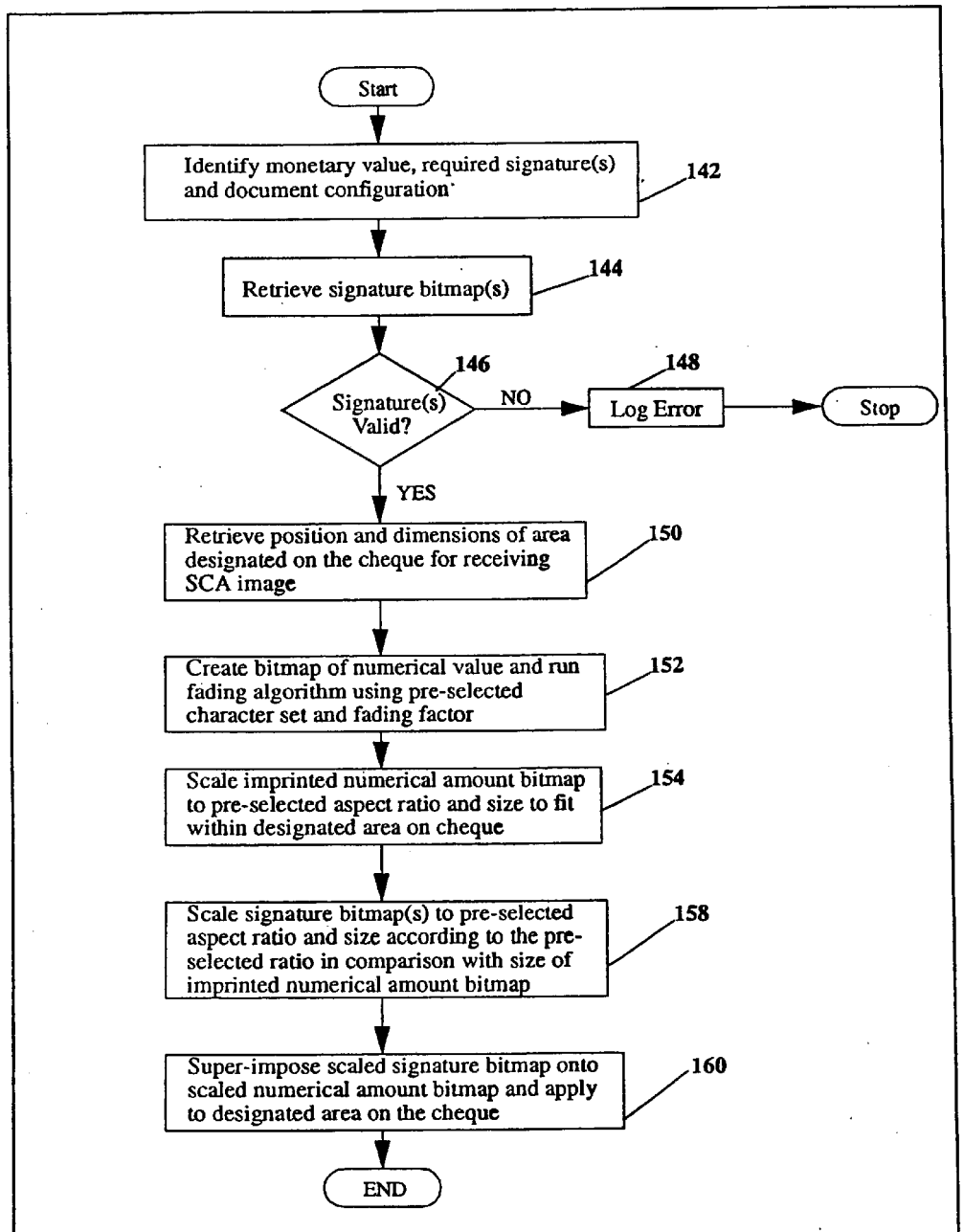
FIG. 2C is a flowchart of an algorithm for producing the security image shown in FIGS. 2A and 2B.

FIG. 2C illustrates the procedural steps in the preferred embodiment for producing the SCA image 140. A first step 142 retrieves, identifies or otherwise selects the following precursor data: a) the identity or type of cheque, i.e. the financial institution, from which the configuration of the cheque can be identified; b) the monetary value of the cheque; c) the signature(s) required to authorize the cheque; and d) the type of font used to depict this data.

A second step 144 retrieves the bitmap 147 of the authorizing signature. Preferably, the signature has been previously scanned in and stored in system 10 using conventional, commercially available software.

A third step 146 performs a validity check, as is known in the art, on the authenticity of the signature and verifies that the authorizing signature is appropriate given the amount of the cheque. If the signature is invalid for any reason, a fourth step 148 logs the error.

A fifth step 150 determines the position and size of a designated area on the cheque where the SCA image 145 is destined to be printed. System 10 preferably maintains a list of types of cheques which the payor organization routinely uses and the associated positions and dimensions of areas thereon allocated for receiving the SCA image 145.

A sixth step 152 creates the numerical amount bit map 145 using the preselected font, as is well known in the art, and runs the fading algorithm 149 on the numerical amount bitmap 145 to create the imprinted numerical value bitmap 151. The fading algorithm is run using a predetermined character set and fading factor. The fading algorithm can be any method that generates a three dimensional representation of text where borders or contrasting colours in the original representation will show up as lines of shadow. In the preferred embodiment, the fading algorithm reverses a source image, i.e. changes the colour black to white and vice versa, to create a reverse image. The images are then processed to convert black colour into a relatively light shade of gray. The source image is then overlayed over the reverse image but offset horizontally and vertically by a specified distance. In this manner, assuming the diagonal offset is to a lower right quadrant, three colour zones are generated for each character: a top-left, centre and bottom-right zone. The top-left zone will be painted white because the white colour in the reverse image is not destructively interfered with by the grey colour in the source image; the centre zone features the light grey shade because it is a combination of the white colour present in the reverse image and the light grey shade in the source image; and the bottom-right zone will be painted a dark grey because the zone combines the light grey shades present in the source and reverse images which constructively combine to yield dark grey. Thus, in the preferred algorithm, the fading factor is the set or vector of horizontal and vertical offset values. The fading factor is stored in the payor system 10 and validation system 15 and therefore can be viewed as an additional hidden image attribute which provides an extra level of security.

A seventh step 154 scales or sizes the imprinted numerical amount bitmap 151 to the size of the allocated area on the cheque and sets the aspect ratio of the bitmap according to a preselected value.

An eighth step 158 scales the signature bitmap 147, as is well known in the art, according to a preselected ratio or proportion between the size of frame 147' and the size of frame 151', as described above. The scaling operation also sets the aspect ratio of bitmap 147 according to a preselected value relative to the aspect ratio of bitmap 151.

A ninth step 160 superimposes the scaled signature bitmap 147 over the scaled background bitmap 151 to form the SCA image 140 which is applied or printed on the designated area on the cheque.

Figure 3A:
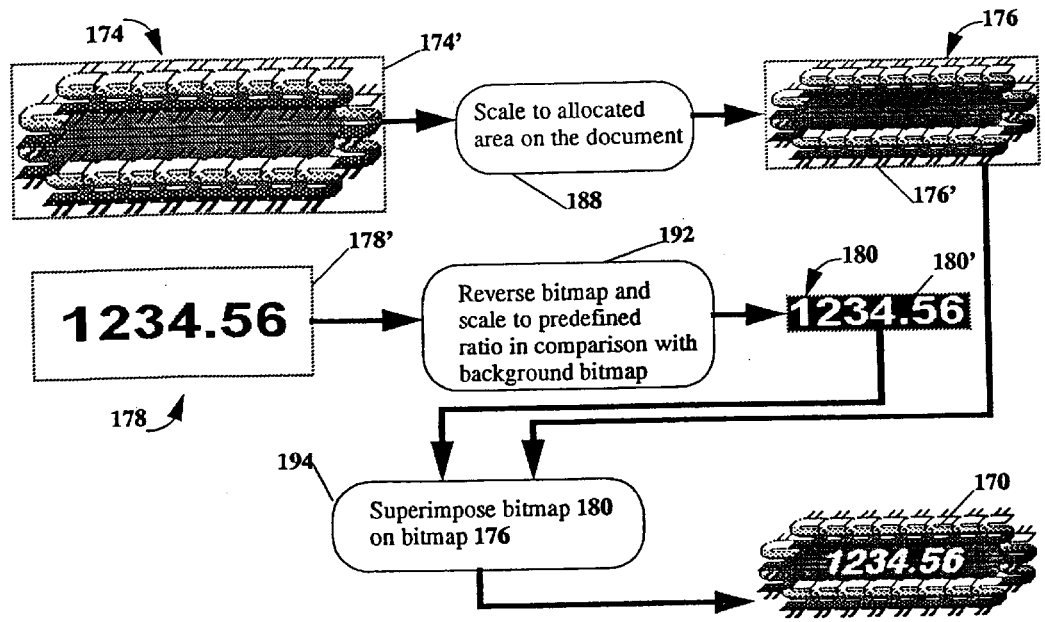
FIG. 3A is a data flow diagram illustrating the composition of a second security image according to the preferred embodiment, the image being composed of the numerical value of the cheque superimposed over a background motif.
Figure 3B:
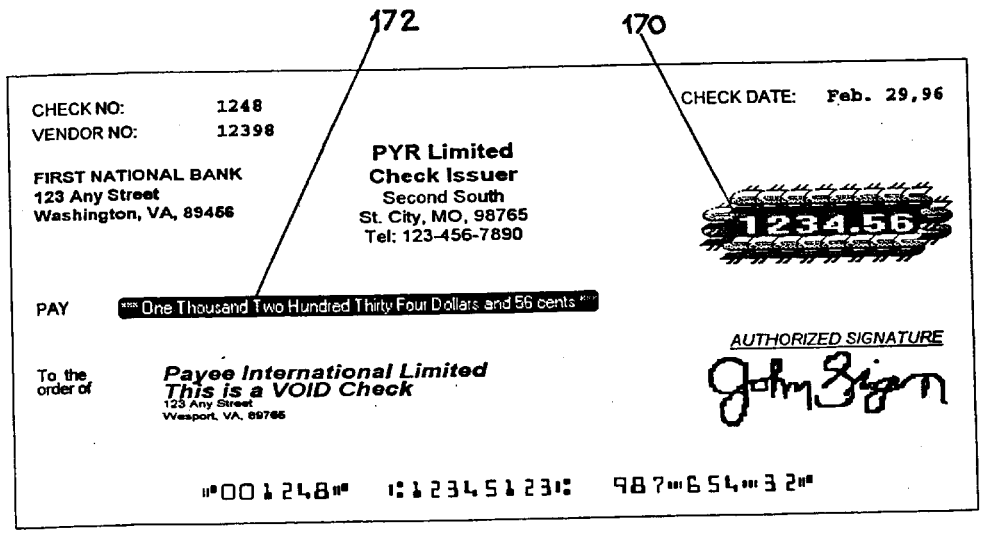
FIG. 3B is an illustration of a cheque having the security image shown in FIG. 3A printed thereon.

The preferred embodiment features another set of security images 170 and 172 referred to as Reversed Bitmap Printed ("RBP") images, printed on the cheque as shown in FIG. 3B. The data flow diagram of FIG. 3A illustrates how foreground and background bitmaps are combined to compose the RBP image 170, the process being similar for image 172.

In a first stage, a bitmap 174 of a background motif stored in system 10 is scaled to fit within an allocated area on the cheque. The scaling process creates a scaled background motif bitmap 176 and sets the aspect ratio of this bitmap to a predefined value.

Figure 3C:
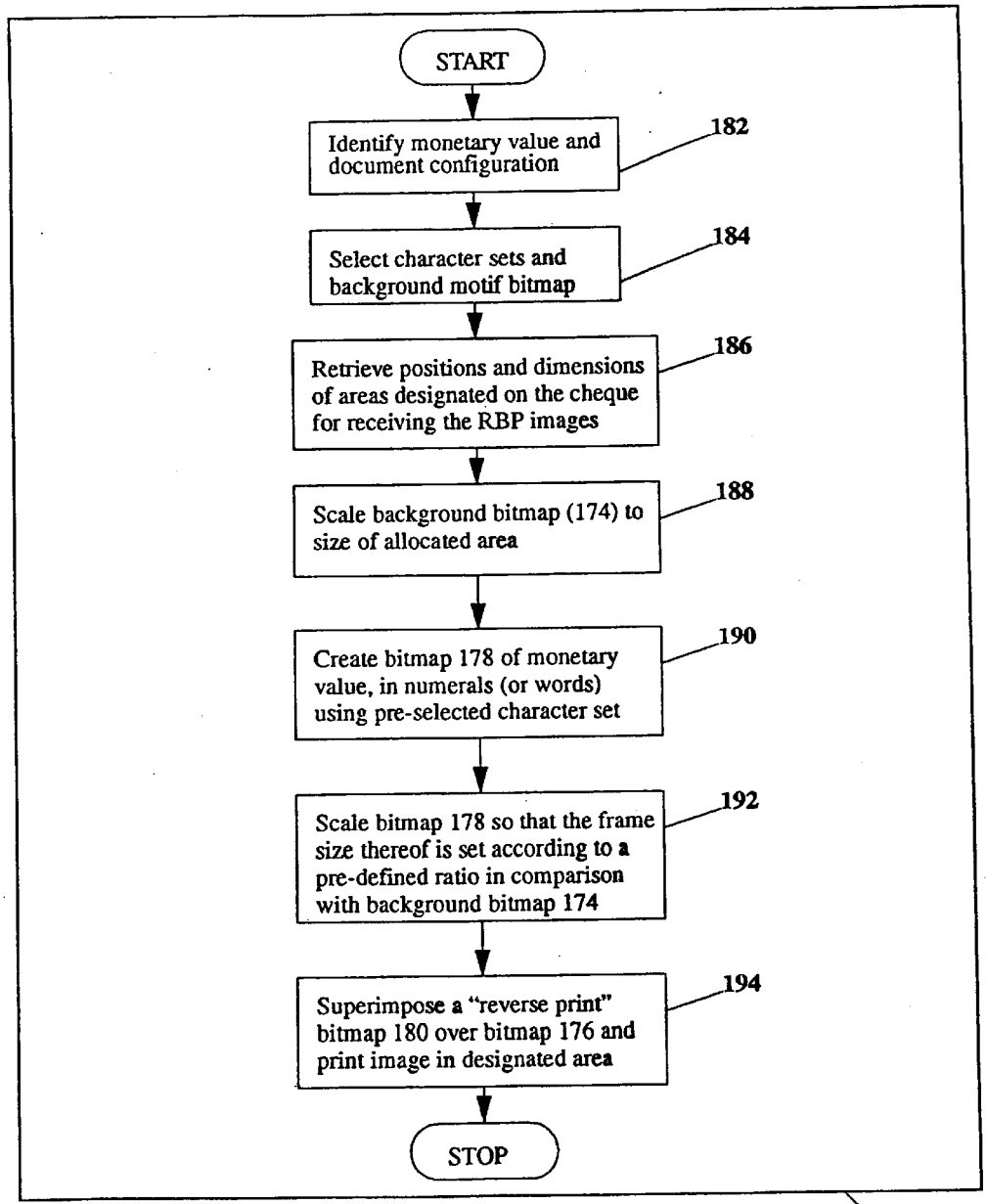
FIG. 3C is a flowchart of an algorithm for producing the security image shown in FIGS. 3A and 3B.

In a second stage, a bitmap 178 is created representing the monetary value, in numerals, of the cheque. This bitmap is then "reversed" and scaled to create a reverse-printed foreground bitmap 180. The scaling process is controlled to achieve a predefined ratio or proportion between the size or area of a frame 180' of foreground bitmap 180 and the size or area of a frame 176' of background bitmap 176. In a third stage, foreground bit map 180 is superimposed onto background bitmap 176. FIG. 3C depicts the preferred algorithm or procedure 166 for creating the RBP image 170 which is similar to the procedure described with reference to FIG. 2C.

Reference has been made in the foregoing to bitmap image manipulations such as creating, scaling, superimposing etc. It will be appreciated to persons skilled in the art that a variety of operating systems having graphical user interfaces have libraries of such functions which are available to the programmer. For instance, in Microsoft Corporation's Windows 3.1 (tm) environment widely available for desktop computers powered by Intel Corporation's 386, 486 and Pentium (tm) microprocessors, a compiler, such as Microsoft's "*Visual C++ Compiler*", Version 2.0 Redmont, Wash., 1994, provides such a library enabling a programmer to readily create, stretch, shrink, overlap, convert and otherwise manipulate bitmaps formatted for a variety of output devices. A prototype version of the preferred embodiment was developed in such an environment.

FIG. 5 show a cheque 204 printed according to the preferred embodiment of the invention. Cheque 204 comprises the encrypted control code as bar code 110, and the security images 140, 170 and 172. For comparison, FIG. 6 is an example of a typical prior art cheque.

Once the cheque 204 is distributed and presented for payment at a bank, a number validation checks can be performed. As a first step, a bank teller or clerk can perform a visual inspection of the security images 140, 170 and 172 to ensure that the foreground bitmaps or images, such as signature bitmap 147 or numerical amount bitmap 180, are confined or framed by the background bitmaps or images such as background bitmaps 151 or 176 respectively. In addition, the teller can, by using a simple ruler or overlay sheet having cutouts of a certain size, verify the dimension of the security images 140 and 170 to ensure that they conform to a standardized size. Thus, the teller can readily determine whether someone has attempted to "lift" a digit from the numerical value and paste it as the most significant digit in the numerical value without attempting to scale the resulting image. Thus, if a teller does not have access to validation system 15 which can verify the ECC, the security images provide a means to quickly disclose amateurish attempts at fraud.

For more sophisticated attempts at fraud and forgery wherein the secrecy surrounding the encryption keys is suspected of being breached, validation system 15 is used to verify the non-visually apparent aspects of the security images. The system 15 can be deployed by the teller at the bank branch, or at the cheque clearing house. In either case, scanner 17 of validation system 15 scans in security images 140, 170 and 172, stores the scanned images in memory and verifies that they contain the predefined attributes described above.

Figure 4:
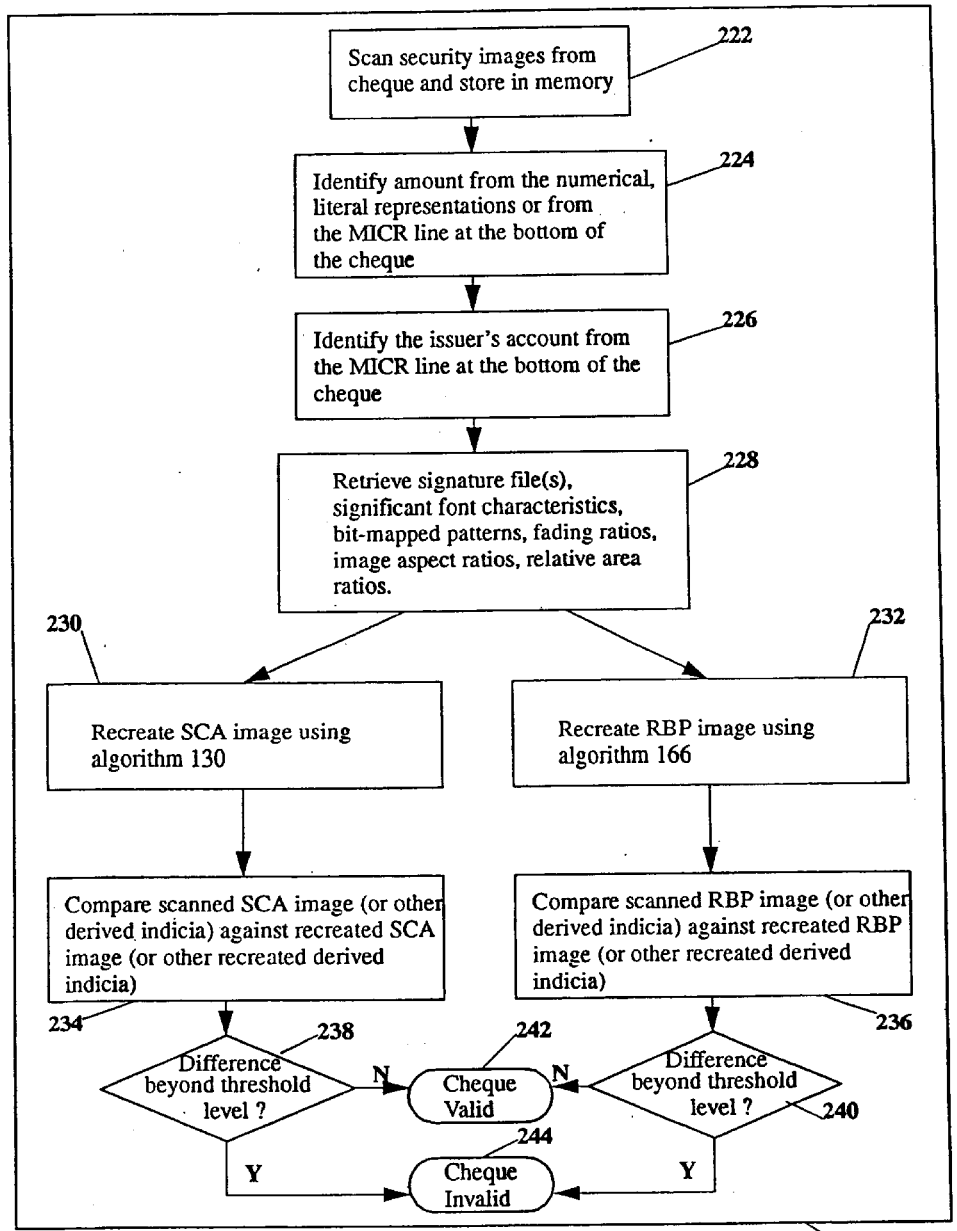
FIG. 4 is a flowchart of an algorithm for validating the security images shown in FIGS. 2A and 3A.

FIG. 4 illustrates the procedural steps of validation software 220 in the preferred embodiment. A first step 232 scans the security images from the cheque and stores the images in memory. Preferably, the security images are situated at pre-defined locations on the cheque 204 and are of predefined sizes so that the scanning process can be readily accomplished. The scanning process is preferably carried out at a relatively lower pixel resolution than the printing process. By doing so, the images are subjected to a low-pass filtering process which will avoid errors when these images are compared as described below.

A second step 224 identifies the numerical value of the cheque. Preferably, this step runs commercially available character recognition software, as is well known in the art, on the SCA image to identify the amount of the cheque. Alternatively, an operator can key in the amount of the cheque. In the further alternative, the amount can be read from the MICR line of the cheque.

A third step 226 identifies the account number of the cheque by reading, as is well known in the art, standard MICR characters 206 typically located at the bottom of the cheque which identify the transit number and account number of the cheque. Preferably, system 15 maintains a database of signature bitmaps which are associated with particular account numbers, hence software 220 can retrieve in a fourth step 228 an authorizing signature bitmap corresponding to the identified account, as well as the predefined bitmap attributes described above.

In the preferred embodiment, the above-described attributes of the scanned images are compared against the preselected values thereof by recreating security images 140, 170 and 172 in validation system 15 and comparing the entire image against the entire scanned security images. Towards this end, a fifth set of steps 230 and 232 recreate the SCA and RBP images, respectively. The security images are recreated using algorithms embodied in software 130 and 166 described above. Thus, for example, in the case of the SCA image 140, the pre-defined scaling factors and aspect ratios of bitmaps 147 and 151, the pre-defined ratio of the size of frame 151' compared against frame 147', and the pre-defined fading factor in the imprint font depicted in bitmap 151, are all reproduced in the recreated SCA image.

Preferably, however, the images are recreated at a lower resolution, using a smaller colour palette, than the printing process, but comparable to the resolution used in scanning step 232.

A sixth set of steps 234 and 236 compare the scanned SCA images of step 222 against the recreated images of steps 230 and 232 for equivalence therebetween using known image processing techniques, such as described in Blum, A., "*Neural Networks in C++*", Wiley and Sons, Toronto, 1992, Section 4.2; and Rosenfeld, Ed., in "Machine Intelligence and Pattern Recognition", Vol. III of *Techniques for 3-D Machine Perception*, North Holland, 1986, New York, all of which is incorporated herein by reference. Based on the comparisons, a seventh set of steps 238 and 240 determine if the difference between the scanned and recreated images are beyond a specified threshold level indicative of the fact the images are not substantially the same and thereby raising the likely possibility that the cheque has been fraudulently tampered with. Thus, it will be seen that the preferred embodiment of the cheque has security images capable of visual and electronic validation.

The preferred embodiment provides desirable economic advantages in that the cheques thereof are produced and verified in a fully automated fashion thereby providing a cost saving over traditional methods of batch cheque printing and verification.

On the printing side, it will not be necessary to incur the expenses of securely storing the cheque prior to preparation. This is because the entire cheque, including the static transit and account codes typically found at the bottom of the cheque, and the variable data, such as the monetary value, payee and the authorizing signature, can be printed "on the fly", i.e. interactively, when required. In contrast, prior art cheques used for batch printing, such as government cheques, may have an authorizing signature applied thereto before being finalized and thus must be securely stored prior to use. Alternatively, the preferred embodiment eliminates the need and associated costs of applying an authorizing signature after the cheque is prepared. In addition, if an MICR laser printer is used to print the cheques of the invention, the costs associated with bursting and decollating traditional form feed paper can be avoided.

On the verification side, the preferred embodiment automatically verifies the cheque. Cost savings are achieved because no human intervention is required apart from ordinary cheque clearance procedures. In addition, indirect savings are accomplished by the substantial elimination of forged and fraudulent cheques. Moreover, the cheques of the preferred embodiment are difficult for a payor to repudiate because of the ECC feature which requires knowledge of the secret key(s) to produce, and which provides essentially random and unique codes thereby identifying the payor who produced such cheques, absent a situation where the security pertaining to the secret key(s) has not been breached.

It will be appreciated by persons skilled in the art that the present invention is not limited by what has been particularly shown and described herein. Rather, the scope of the present invention is defined only by the claims which follow.

What is claimed is:

1. A process of validating a negotiable financial instrument made by a payor, in which selected information found on the financial instrument which varies for each instantiation of the financial instrument made by the same payor is encrypted in combination with key information not found on the financial instrument to generate a control code which is printed on the financial instrument along with the selected information, the process comprising:

reading the selected information from the financial instrument; and one of (i) decrypting the control code to thereby obtain decrypted information whereby the cheque validator may refuse to honour the financial instrument if the selected information found on the financial instrument does not match the decrypted information, and (ii) re-encrypting the selected information as presented on the financial instrument to re-obtain a second control code, whereby the cheque validator may refuse to honour the financial instrument if the second control code does not match the control code printed on the financial instrument.

2. A process according to claim 1, wherein: the selected information is encrypted using a public key scheme, the key information comprises one of public and private encryption keys associated with one of the payor or a validator of the instrument, and the control code is decrypted using the other of the private and public keys.

3. A process according to claim 2, wherein the public key scheme is an RSA scheme.

4. A process according to wherein the selected information is encrypted using a secret key scheme, the key information comprises a private key, and the selected information is re-encrypted using the private key.

5. A process according to claim 1, wherein the negotiable instrument is a cheque.

6. A process according to claim 1, wherein machine-readable characters corresponding to the control code are printed on the instrument.

7. A process according to claim 1, wherein the selected information includes a monetary value of the instrument.

8. A process according to claim 1, wherein the selected information includes a payee of the instrument.

9. A system for validating the authenticity of selected information found on a negotiable financial instrument, wherein the selected information varies for each instantiation of the financial instrument presented by the same payor, and wherein the selected information is encrypted in combination with key information not found on the financial instrument to generate a control code which is printed on the financial instrument along with the selected information, the system comprising:

a scanner for reading the selected information and the control code from the financial instrument; and a data processing device programmed to (i) decrypt the control code and generate decrypted information for comparison against the selected information found on the financial instrument and for generating a signal in response to the equality thereof, or, (ii) re-encrypt the selected information as found on the financial instrument to re-obtain a second control code and for generating a signal in response to the quality of the control code found on the financial instrument against the second control code.

10. A process according to claim 9, wherein: the selected information is encrypted using a public key scheme, the key information comprises one of public and private encryption keys associated with one of the payor or a validator of the instrument, and the control code is decrypted using the other of the private and public keys.

11. A process according to claim 9, wherein the public key scheme is an RSA scheme.

12. A process according to claim 9, wherein the selected information is encrypted using a private key scheme, the key information comprises a private key, and the selected information is re-encrypted using the private key.

13. A system according to claim 9, wherein the negotiable instrument is a cheque.

14. A system according to claim 9, wherein the selected information includes a monetary value of the instrument.

15. A system according to claim 9, wherein the selected information includes a payee of the instrument.

16. A process of validating a negotiable financial instrument made by a payor, in which selected information found on the financial instrument that varies for each instantiation of the financial instrument made by the same payor is encrypted in combination with a private encryption key associated with one of the payor or a validator of the financial instrument using a digital signature encryption scheme to generate a digital signature which is printed on the financial instrument along with the selected information, the process comprising:

reading the selected information from the financial instrument; and verifying the authenticity of the digital signature based on the public key and the read selected information.

17. A process according to claim 16, wherein the instrument is a cheque.

* * * * *